United States Patent [19]
Smith

[11] Patent Number: 5,940,625
[45] Date of Patent: Aug. 17, 1999

[54] DENSITY DEPENDENT VECTOR MASK OPERATION CONTROL APPARATUS AND METHOD

[75] Inventor: James E. Smith, Mt. Horeb, Wis.

[73] Assignee: Cray Research, Inc., Eagan, Minn.

[21] Appl. No.: 08/706,808

[22] Filed: Sep. 3, 1996

[51] Int. Cl.$^6$ .................................................. G06F 15/00
[52] U.S. Cl. ............................ 395/800.05; 395/800.04; 395/800.06; 395/565
[58] Field of Search ....................... 395/800.05, 800.04, 395/800.09, 376, 565, 800.06

[56] References Cited

U.S. PATENT DOCUMENTS

| | | | |
|---|---|---|---|
| 4,128,880 | 12/1978 | Cray | 395/200 |
| 4,630,192 | 12/1986 | Wassel et al. | 395/562 |
| 4,661,900 | 4/1987 | Chen et al. | 364/200 |
| 4,680,730 | 7/1987 | Omoda et al. | 711/169 |
| 4,841,438 | 6/1989 | Yoshida et al. | 395/800.05 |
| 4,852,049 | 7/1989 | Sakai | 711/214 |
| 5,241,490 | 8/1993 | Poon | 364/715.04 |
| 5,568,410 | 10/1996 | Béchade | 364/715.1 |

OTHER PUBLICATIONS

"The Best Way to Achieve Vector–Like Performance" J.E. Smith Cray Research Inc., Apr. 1994.

*Primary Examiner*—Larry D. Donaghue
*Attorney, Agent, or Firm*—Schwegman, Lundberg, Woessner, and Kluth, P.A.

[57] ABSTRACT

A vector processing system which uses vector masks to determine whether or not to perform operations on operands corresponding to bit positions within the mask is disclosed. An approximation of the number of no-operation representative bits in a vector mask register is made, and such bits are skipped to improve the performance of vector mask based operations. The number of consecutive no-op representative bits, as represented by zero values, skipped is a power of two to simplify the circuitry and logic involved in skipping such operations.

18 Claims, 4 Drawing Sheets

```
V1  <-- a              ;LOAD a(i)                       ~210
V2  <-- b              ;LOAD b(i)                       ~215
VM  <-- V1==V2         ;COMPARE a AND b; RESULT TO VM   ~220
V3  <-- d; VM          ;LOAD d(i) UNDER MASK            ~225
V4  <-- V1+V3; VM      ;ADD UNDER MASK                  ~230
c   <-- V4; M          ;STORE TO c(i) UNDER MASK        ~235
```

DENSITY DEPENDENT VECTOR MASK OPERATION CONTROL APPARATUS AND METHOD

FIELD OF THE INVENTION

The present invention relates to methods and systems for improving performance of vector processors, and in particular to reducing the number of non-performed operations when processing in accordance with a mask vector.

BACKGROUND OF THE INVENTION

Many scientific data processing tasks involve extensive arithmetic manipulation of ordered arrays of data. Commonly, this type of manipulation or "vector" processing involves performing the same operation repetitively on each successive element of a set of data. Most computer are organized with an arithmetic unit which can communicate with a memory and with input-output(I/O). To perform an arithmetic function, each of the operands (two numbers to be added, subtracted or multiplied or otherwise operated upon) must be successively brought to the arithmetic unit from memory, the functions must be performed, and the result must be returned to the memory. Machines utilizing this type of organization, called scalar machines, are not normally optimized for practical use in large scale vector processing tasks.

In order to increase processing speed and hardware efficiency when dealing with ordered arrays of data, vector machines have been developed. A vector machine is one which deals with ordered arrays of data by virtue of its hardware organization, rather than by a software program and indexing, thus attaining higher speed of operation. One such vector machine is disclosed in U.S. Pat. No. 4,128,880, issued Dec. 5, 1978. The vector processing machine of this patent employs one or more registers for receiving vector data sets from a central memory and supplying the data to segmented functional units, wherein arithmetic operations are performed. More particularly, eight vector registers, each adapted for holding up to sixty-four vector elements, are provided. Each of these registers may be selectively connected to any one of a plurality of functional units and one or more operands may be supplied thereto on each clock period. Similarly, each of the vector registers may be selectively connected for receiving results. In a typical operation, two vector registers are employed to provide operands to a functional unit and a third vector register is employed to receive the results from the functional unit.

Further vector type machines are described in U.S. Pat. No. 4,661,900, issued Apr. 28, 1987 wherein multiple processor are each connected to a central memory through a plurality of memory reference ports. The processors are further each connected to a plurality of shared registers which may be directly addressed by either processor at rates commensurate with intraprocessor operation. A vector register design provides each register with at least two independently addressable memories, to deliver data to or accept data from a fimctional unit.

Many times, computer programs which are generating requests to perform operations on an array of data in a vector register will have a condition which must be true for any given element prior to performing the operation. In this case, while all the operands may be present in the vector registers, the processor may or may not perform the operation for each pair of operands from the vector registers. To make such processing more efficient, vector masks, which comprise a bit position for each of the elements in the operand vectors are used to determine if an operation is performed on a corresponding operand pair from the operand registers. If the value in the mask is a one, the operation is performed on the corresponding pair. If the value in the mask at a given bit position is a zero, a no-operation, commonly referred to as a no-op is performed. Essentially, the processor does nothing for one processor cycle.

The no-op consumes valuable processor cycles and can lead to severe performance degradation by actually performing operations and then canceling the results so that the machine state is not altered. Vector density is defined as the number of real operations to be performed on data in a vector register or multiple vector registers. Those vectors having a low vector density result in many no-ops being performed and are inefficient. Those vectors having high vector density are more efficient because less time is proportionately spent on no-ops. There is a need to bring the total execution time for vectors in line with the number of real operations to be performed. A directly proportional relationship between vector density and execution time is desired. There is a need to skip no-ops for zero values in the vector mask to improve performance time without greatly increasing the number of circuits required to skip no-ops.

SUMMARY OF THE INVENTION

An approximation of the number of no-operation representative bits in a vector mask register is made, and such bits are skipped to improve the performance of vector mask operations. The number of consecutive no-op representative bits skipped is a power of two to simplify the circuitry and logic involved in skipping such operations. Zeros are used to represent no-ops. The vector mask register is inspected for only leading zero counts of 1, 3, 7, 15, . . . max VL-1 where VL is the maximum hardware vector length.

In one embodiment where vector elements are read and sent to units for performance of operations, the leading zeros following a 1 in the vector mask are detected by a plurality of leading zero detectors of the length described above. The highest number of zeros detected result in that number of no-ops being skipped during a clock cycle. If the next bit is a one, the operation is performed during the same clock cycle. If it is a zero, then the leading zero detectors are employed again to skip more zeros. This may result in a no-op being performed if the second check cannot be done early enough in a cycle. The powers of two skipping provides much better performance than that obtained by performing no-ops for each leading zero. In low density vectors, many zeros are skipped without the performance of a no-op, bringing actual execution times much closer to a proportional relationship with the vector density.

In a further embodiment related to performance of memory operations such as loads and stores, the leading zero detectors control a shifter, which provides a shift value to a counter for providing the next memory address of an operand. The stride value is an amount to be normally added when determining successive memory addresses for further operands. The stride value and the shift value are multiplied to obtain the next address for the next element or operation to be used by a functional unit.

The leading zero detectors also provide control to an adder which produces pointers to the head and tail, IE. the beginning and end, of the vector register.

By using zero detectors based on a power of two approximation, the circuitry for skipping and calculating next memory addresses and other operations is much simplified over that required by obtaining an accurate count of the precise value to be skipped. The implementation of the power of twos detectors may be done with simple logical OR gates.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is defined by the appended claims.

Numbering in the Figures is usually done with the hundreds and thousands digits corresponding to the figure number, with the exception that the same components may appear in multiple figures. Signals and connections may be referred to by the same number or label, and the actual meaning should be clear from the context of use.

Figure 1:
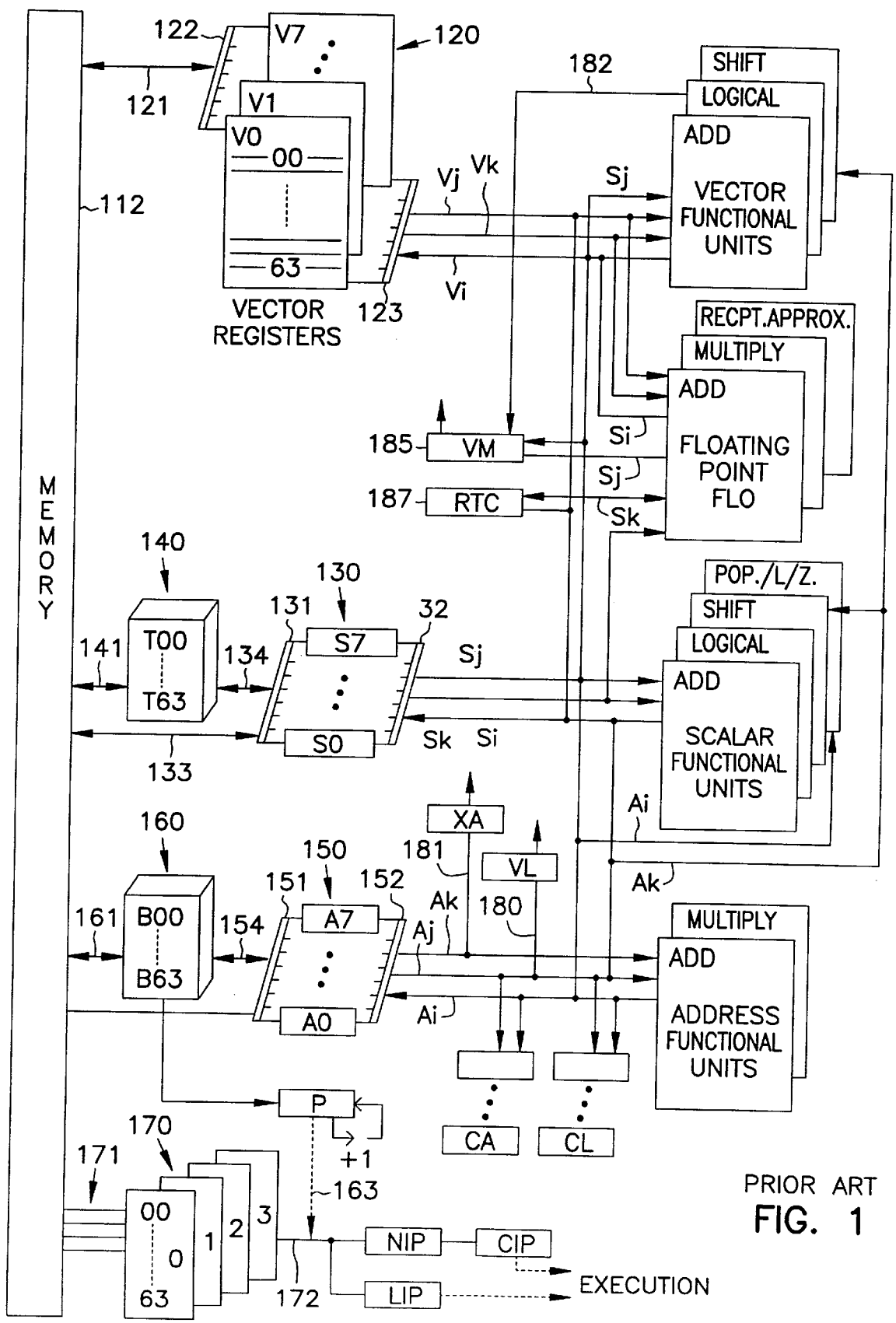
FIG. 1 is a detailed block diagram of a prior art computer system.

In FIG. 1, a prior computer system as described in U.S. Pat. No. 4,128,880, is shown to provide the setting for the present invention. A memory 112 provides arrays of data, referred to individually as operands for a plurality of vector registers 120. The vector registers form the major computational registers of the computer, since they provide for the high speed vector processing of data. In one embodiment, there are 64 individual vector registers. Each register has 64 individual elements, as indicated by the designation of elements 00 through 63 on vector register V0. Each element can hold a 64 bit word.

The specific numbers used herein for word length, number of registers, length of vector registers and the like relate to one embodiment. It will be understood that the principles according to the present invention as set forth herein are equally applicable to other configurations of machines using a different number of vector register, vector lengths, or a different word size.

A data path or trunk 121 is provided for data transfers between the vector registers and memory 112. Data path 121 connects to a signal path select, or fan-out 122 for communicating with individual vector registers. Another fan-out 123 is indicated for communicating from any of the vector registers to the functional units.

In the computer system of FIG. 1, there are three functional units dedicated to vector processing. These are the add unit, the logical unit and the shift unit. Three additional functional units are shared between the vector and scalar portions of the machine. These are the floating point functional units for addition, multiplication and reciprocal approximation. In further embodiments, and detail not shown, there are parallel units performiing the same functions, and the same operations on different portions of the registers in parallel. Pipeline processing is also provided, where the functional units are coupled to pipeline type registers holding instructions and/or data for execution in succeeding machine cycles.

Scalar registers are also provided as indicated at 130 for operation with four scalar units as indicated. A plurality of T registers 140 are provided to support scalar operations. The T registers 140 communicate with memory by a data path 141. Fan-outs 131 and 132 are provided for communicating with individual S registers. A data trunk 133 leads directly between fan-out 131 and memory 112. Another data path 134 communicates between the T registers and the fan-outs for the scalar registers.

A plurality of address registers 150 are provided. Fan-outs 151 and 152 are used for communication with individual address registers. A plurality of B registers 160 are provided to support address operations. A data path 154 provides communication from the B registers to fan-out 151 for the A registers, and a data path 153 interconnects memory 112 and the A registers.

Instruction buffers 170 are provided as part of the instruction issue and control portions of the computer. In on embodiment, four instruction buffers are utilized. Each instruction buffer has capacity for 64 instruction parcels, numbered 00 through 63 as indicated with respect to instruction buffer 0. Instructions from the instruction buffers are fed via an instruction line 172 to a pair of control registers NIP, which stands for next instruction parcel and LIP which stands for lower instruction parcel. Instructions from NIP may be passed to the current instruction parcel register CIP.

The P register is part of the instruction issue and controls portions of the computer. It connects via lines 162 and 163 to the B registers and to the instruction line 172.

A vector length register VL is provided, which may receive an input on a data line 180 from the A registers. XA refers to an exchange control register which is connected by a data line 181 to the A registers. VM 185 is the vector mask register, and RTC 187 is the real time clock.

The data and instruction paths or trunks among the various registers and functional units will now be described. The paths are indicated by means of letters V for vector, S or scalar and A for address. In addition, subscripts i, j and k are used. Subscripts j and k are used for registers or data paths supplying operands, and subscript i is used for registers or data paths receiving results.

Data paths $V_j$ and $V_k$ run from vector register fan-out 123 to the vector functional units and the floating point functional units. Data path $V_i$ runs from the vector functional units and the floating point functional units to vector register fan-out 123.

In similar manner data paths $S_j$ and $S_k$ run from scalar register fan-out 123 to the scalar functional units and the floating point functional units. Data path $S_i$ returns from the floating point functional units and the scalar functional units to fan-out 132. Additionally, data path $S_j$ connects to the real time clock, the vector mask register, and to the vector functional units. A data path 182 connects from the logical unit of the vector functional units to the vector mask register.

Data paths $A_j$ and $A_k$ run from fan-out 152 of the address register to the address functional units. In addition, the $A_k$ path provides address operands to the shift scalar functional units. In addition, the $A_k$ path provides address operands to the shift scalar functional unit and the shift vector functional unit. Data path $A_k$ also runs to the channel address and channel limit registers. $A_i$ data path runs from the address functional units, the CA and CL registers, and from the population/leading zero scalar functional unit to fan-out 152 of the address registers.

Vector Registers

As previously mentioned, the V registers are the major computational registers of the computer system. When associated data, such as that in an array, is grouped into successive elements of a V register, the register quantity is considered a vector. Examples of vector quantities are rows or columns of a matrix, table or spreadsheet. Computational efficiency is achieved by processing each element of a vector identically, whether by a single functional unit, or multiple units each processing a portion of the vector. Vector instructions provide for the iterative processing of successive V register elements. For a given vector operation, one or more V registers are designated for providing operands ($V_j$ and $V_k$ registers), and another V register is designated to receive the results ($V_i$ register). A vector operation begins by obtaining operands from the first element of one or more V registers and delivering the results to the first element of the $V_i$ register. Successive elements are provided in each clock period, and as each operation is performed, the result is delivered to successive elements of the result V register, $V_i$. The vector operation continues until the number of operations performed by the instruction equals a count specified by the contents of the vector length (VL) register. Vectors having lengths exceeding 64 are handled under program control in groups of 64 and a remainder.

The contents of a V register are transferred to or from memory over data path 121 in a block mode by specifying a first word address in memory, an increment for the memory address, and a vector length. The transfer then proceeds beginning with the first element of the V register at a maximum rate of one word per clock period, depending upon memory bank conflicts. In a further embodiment, a software memory manager is used to determine the address for each successive word, as they may or may not be contiguously stored.

The vector length register (VL) can be set by transmitting a value to and from an A register. The VL register specifies the length of all vector operations performed by vector instructions, and the corresponding length of the vectors held by the V registers.

The vector mask register (VM) has 64 bits, each of which corresponds to a word element in a vector register. Bit 0 corresponds to element 0, and bit 63 to element 63. The mask is used in conjunction with vector merge and test instructions and to control whether various operations are to be performed on individual vector elements. In one embodiment of the present invention, vector masks are only used with vector merge instructions. In yet another, they are used in all operations involving the use of a mask. The vector mask register VM may be set from an S register, or the vector mask contents may be generated by testing a vector register for a condition by the logical vector functional unit. This may result from executing a program written in a higher level language containing simple IF statements as occurs in the following short program:

```
do 190 i=1,looplen
    if (a(i).eq.b(i)) then
        c(i) = a(i) + d(i)
    endif
190 continue
```

This is a simple IF loop where one of the operands (a(i)) accessed with the scope of the IF statement is already loaded (to do the IF test), and the second operand (d(i)) needs to be loaded from the memory within the scope of the IF statement. Using masked operations, as described in a pseudo code representation in FIG. 2, a(i) is first loaded at 210, and b(i) is loaded at 215. At 220, each element of a and b are compared, and if equal, a one is loaded into a vector mask VM. If not equal, VM is loaded with a zero. d(i) is loaded into a third vector V3 at 225 as identified by the VM, and a fourth vector is loaded with an add of V1 and V3 under the mask at 230. Finally, c(i) is loaded under the mask at 235.

Vector Register Control

Figure 3:
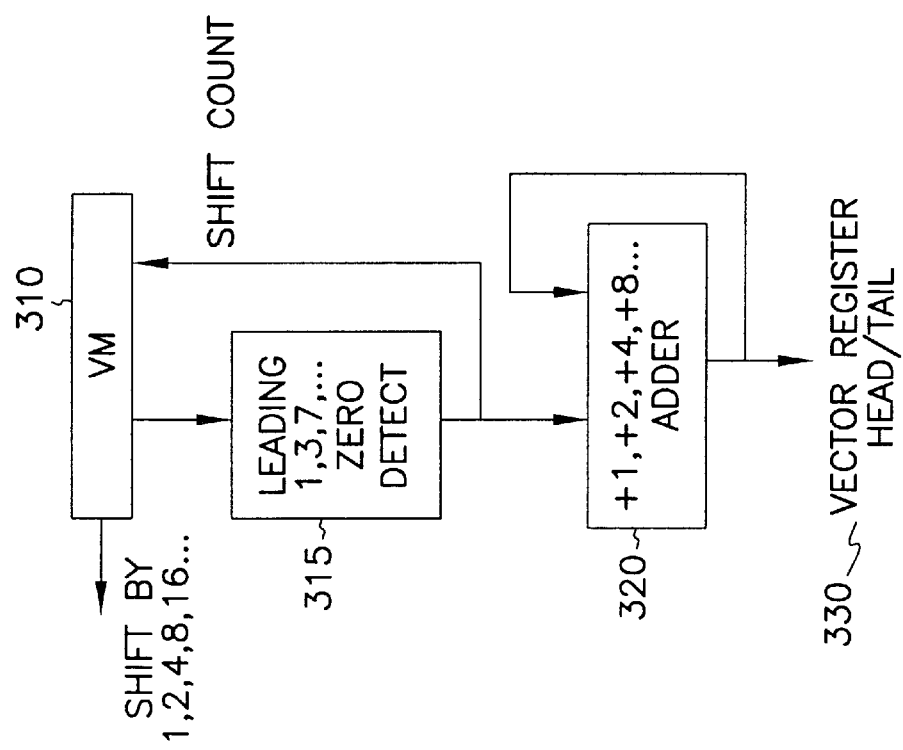
FIG. 3 is a block diagram representation of vector mask shifting control.

In one embodiment of the present invention a control block diagram for a vector register is shown in FIG. 3. This may be used with the prior system of FIG. 1 for vector merge and test instructions, and also with other vector architectures where all vector instructions may be masked by a vector mask as indicated at 310. Coupled to it are a plurality of leading zero detectors indicated at 315. Each detector detects a predetermined number of zeros following the last bit position used in the vector mask 310. The number of zeros in one embodiment are consecutive powers of two minus one. This corresponds to strings of leading zeros of length 1, 3, 7, 15, 31 and 63 given a 64 bit length mask. For larger masks, the highest value would be one less than the highest power of two by which the mask length is divisible. In a further embodiment, there is no 63 bit length detector because it requires a higher cost of circuitry to implement than is correspondingly gained in performance. The leading zero detectors 315 detect the zeros, and each one successfully detecting its designated number of zeros provides a positive indication. The highest positive indication of zeros, the shift count, is provided back into the vector mask to shift that number, plus one to get to the start of either a one or the next string of zeros. The value, plus one is also provided to an adder 320, which provides a header/tail pointer 330 for the vector register(s) to which the mask is being applied. Note, that if the next bit position in the vector mask is a one, then an operation is performed on the corresponding operands in the vector registers during the same clock cycle. If not, the next string of leading zeros is detected.

Figure 4:
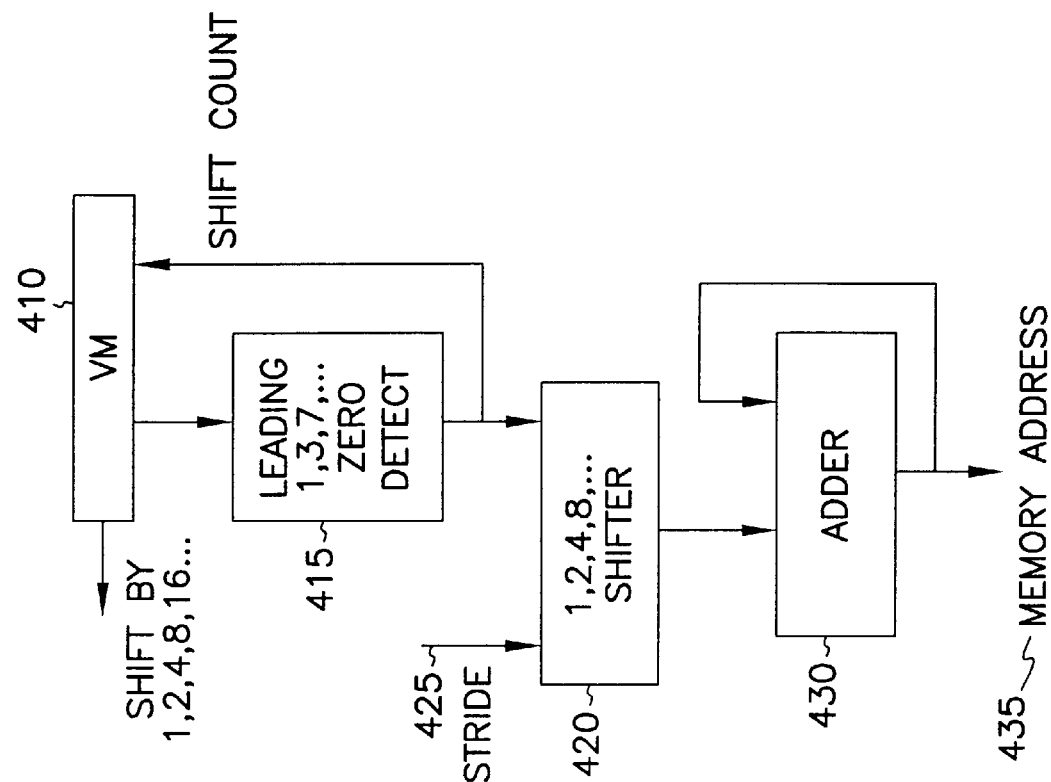
FIG. 4 is a block diagram representation of vector mask memory address determination.

Logic for determining a sequence of next memory addresses of operands for load and store instructions where non-unit strides may be used is shown in block diagram form in FIG. 4. The vector mask is indicated at 410. Coupled to it are a plurality of leading zero detectors indicated at 415. Each detector detects a predetermined number of zeros following the last bit position used in the vector mask 410 as in FIG. 3. The leading zero detectors 415 detect the zeros, and each one successfully detecting its designated number of zeros provides a positive indication. The highest positive indication of zeros, the shift count, is provided back into the vector mask to shift that number, plus one to get to the start of either a one or the next string of zeros. The value is also provided to an address shifter 420. Also provided to address shifter 420 is a stride value on line 425. The stride value indicates how many bit positions to skip when performing an operation on a vector. The leading zero indication plus one, and the stride value are multiplied, and the result is provided to an adder 430 to provide the next memory address for either storing or retrieving data. The sum of the leading zero count with one times the stride value provides a binary shift amount, which simplifies logic circuitry.

Figures 2, 5:
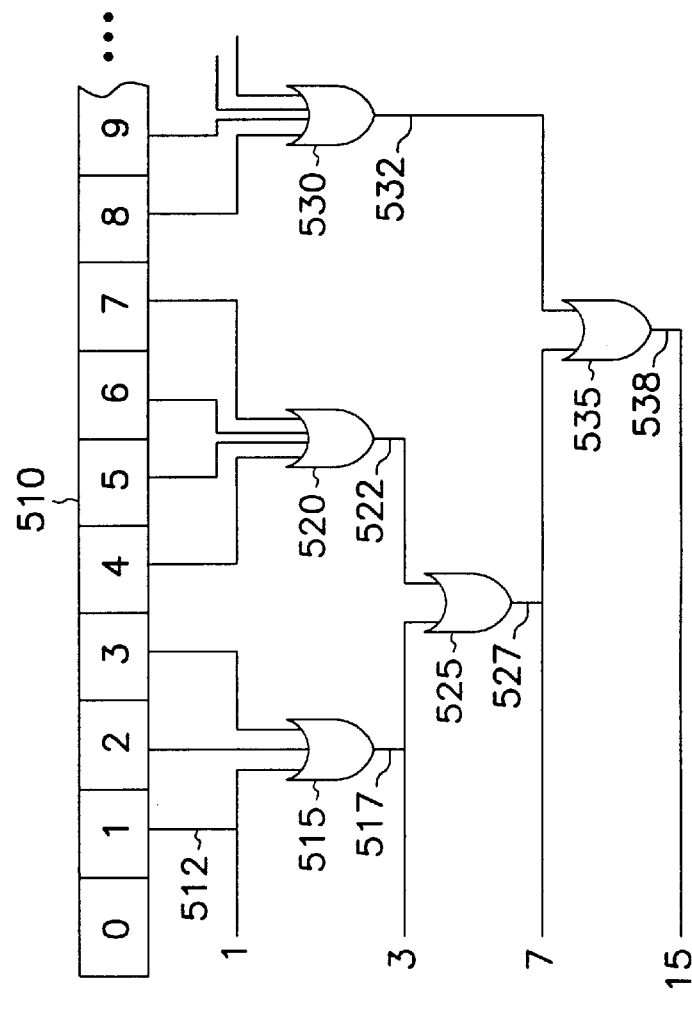
FIG. 2 is a pseudo-assembly language representation of a typical mask based operation.
FIG. 5 is a logic diagram of a set of zero detectors in accordance with one embodiment of the present invention.

Skipping leading zeros only by selected numbers of zeros, such as powers of two, as opposed to providing complex circuitry to quickly determine the exact number of zeros to skip, permits the use of simple connections to standard logic circuitry to implement the detectors in a cascaded arrangement. More circuitry would both consume semiconductor chip space and power, producing more heat which would need to be dissipated. In one embodiment, common OR logic circuitry is coupled to the appropriate number of leading bit positions as shown in FIG. 5 as controlled by the vector register head/tail count. The leading bits of a mask register are indicated at 510 by numbers 0 through 9. There are more bit positions as indicated by the dots, corresponding to the highest number of leading zeros to be detected at one time. The zero bit position is used to control operation during the current processor cycle. A one leading zero indicator 512 simply comprises a line providing the value in the leading bit position, 1. A zero on line 512 indicates that there is at least one leading zero. A leading zero indicator comprising OR gate 515 is coupled to bit positions 1, 2 and 3, and provides its output on line 517. A zero on line 517 signifies that there are at least three leading zeros. OR gate 520 is coupled to bit cells 4, 5, 6, and 7 and provides a logical OR of the values in those cells on a line 522 to an OR gate 525, which also receives the value on line 517. OR gate 525 provides a zero value if there are at least seven leading zeros. OR gate 530 is coupled to further bit positions, providing its output on line 532 to OR gate 535, which provides an output on line 538 representative of the number of leading zeros of all the bit positions which it is directly or indirectly coupled.

Figure 6:
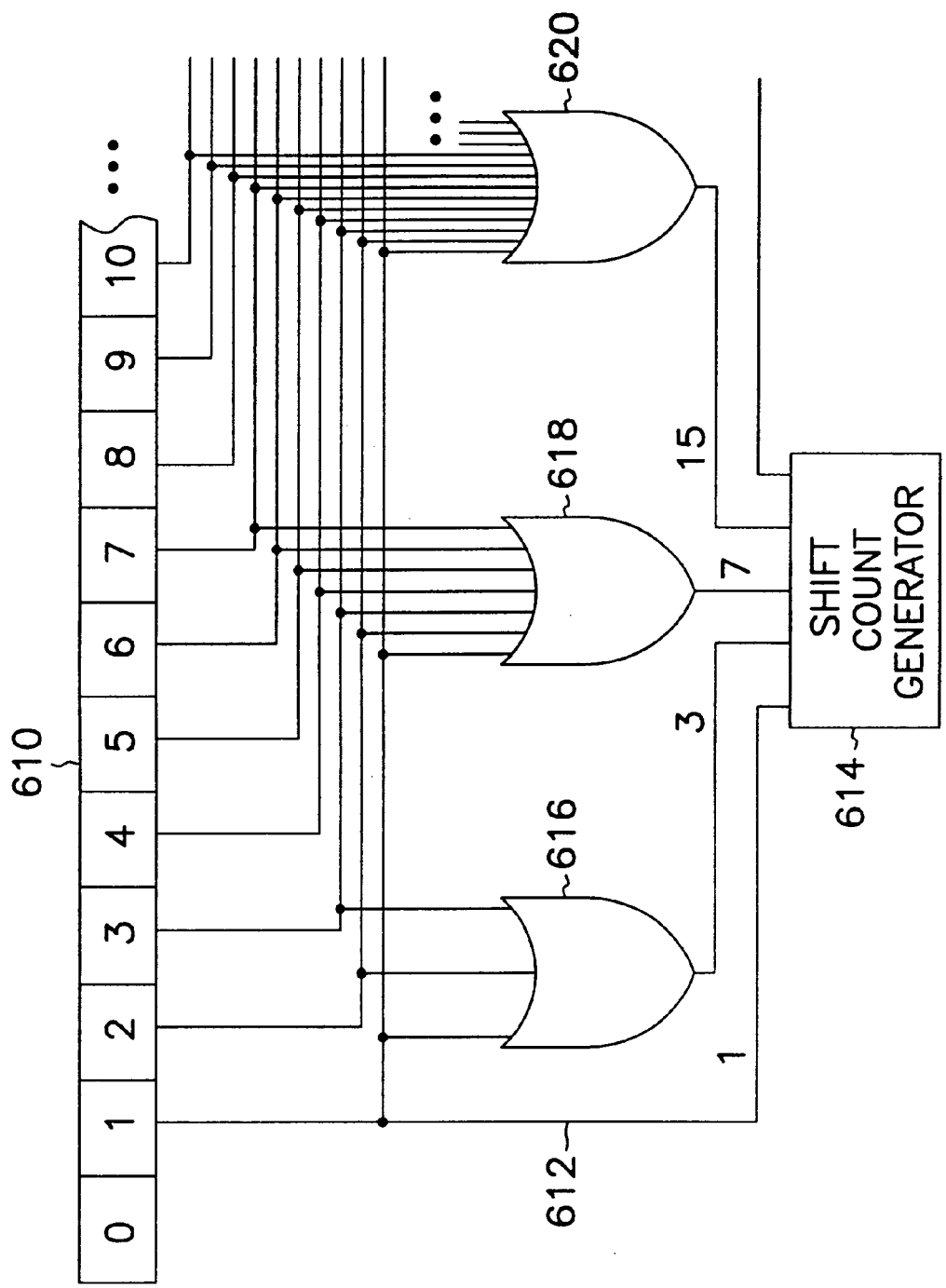
FIG. 6 is a logic diagram of an alternative set of zero detectors.

Alternative circuitry to reduce gate delays and generate the shift counts as quickly as possible by using parallel logic, minimizing gate delays, is shown in FIG. 6. The leading bits of a multibit mask register 610 are indicated by numbers 0 through 10. A one leading zero indicator comprising conductive line 612 is coupled to a shift count generator 614. An OR gate 616 is used to detect three leading zeros by being coupled direction to bit positions 1, 2 and 3. It also provides its output to the shift count generator 614. Similarly, a seven count leading zero detector 618 and a 15 count leading zero detector 620 are each coupled to the requisite number bit positions, and provide their outputs to the shift count generator. The shift count generator 614 then provides the shift count as shown at 315 and 415 in FIGS. 3 and 4. This alternative circuitry provides a very fast way of determining the correct number of leading zeros because there are few logic levels to traverse. In addition to OR logic gates, it would be a simple matter for one skilled in the art to implement the same function in NOR gates, or other families of logic gates.

As can be appreciated by one skilled in the art, it is a simple matter to provide more counters than those shown to count powers of two. Perhaps it is more likely that lengths of four or five leading zeros might be encountered. In a further embodiment, more OR gates are provided to make such a determination, especially for the lower numbers of leading zeros.

The performance of the approximation method of the present invention is close to that provided by using more complicated circuitry to skip the exact number of leading zeros. Take for example the following representation of the bits in a vector mask:

1011 0000 1000 1000 0101 0001 1011 0000

An actual density-time implementation (one that skips all zeros without loss of a processor cycle will take 11 processor cycles, the number of ones in the vector mask. With the power of two approximation, the first element will be executed, then one zero will be skipped over to get to the next 1 on the very next clock period. The third one will be done immediately. Then, the run of four zeros is encountered. The three-zero detector will be active and the seven-zero detector will be inactive. Consequently, three zeros will be skipped. The next element is still a zero, so there will be a no-op. This run of four zeros will take two cycles to skip. The processing of the vector mask continues until, at the end, the last one is finished; then all remaining zeros are skipped, and the entire vector is finished. Overall, execution of an operation gated by this mask vector takes two processor cycles more than actual density-time, or 13.

It is to be understood that the above description is intended to be illustrative, and not restrictive. Many other embodiments will be apparent to those of skill in the art upon reviewing the above description. While the vector length was described as being 64 bits, much larger lengths are contemplated such as 128 or 256 bits. The scope of the invention should, therefore, be determined with reference to the appended claims, along with the full scope of equivalents to which such claims are entitled.

What is claimed is:

1. A leading zeros detector for a vector mask in a vector processing system comprising:

a plurality of leading zero detectors of different non-consecutive numbers of leading zeros coupled to the vector mask for detecting selected numbers of leading zeros in the mask and providing a shift count; and an adder coupled to the detectors for incrementing a mask register pointer, based on the detector of the highest number of leading zeros, to point at the next bit in the mask register to be used.

2. The leading zeros detector of claim 1 and further comprising a next address generator coupled to the leading zeros detectors for determining a memory address as a function of the number of zeros detected.

3. The leading zeros detector of claim 1 wherein the leading zeros detectors comprise logical OR gates coupled to the vector mask.

4. The leading zeros detector of claim 1 wherein the leading zero detectors comprise a plurality of detectors, each for detecting a consecutive power of 2 minus 1 number of leading zeros and wherein the detector of the highest number of leading zeros increments the mask register pointer in accordance with the number of zeros it detected plus 1.

5. The leading zeros detector of claim 4 and further comprising a next address generator coupled to the leading zeros detectors for determining a memory address as a function of the number of zeros detected.

6. The leading zeros detector of claim 5 wherein the leading zeros detectors comprise logical OR gates coupled to the vector mask.

7. A vector processing computer system comprising:

a first data vector register for storing multiple data words;

a vector mask register having a bit position corresponding to each word in the first data vector register wherein a zero value in a bit position is an indication that no operation should be performed on the corresponding word in the first data vector register;

a processor coupled to the first data vector register and the vector mask register for performing operations on the words in the first data vector register based on the value in each corresponding bit position in the vector mask register;

a plurality of different, non consecutive size leading zero detectors coupled to the processor, the vector mask register and the first data vector register for approximating the number of leading zeros such that no operations are performed by the processor for the approximated number of leading zero; and a second data vector register for storing multiple data words wherein the vector mask register bit positions correspond to each word in the second data vector register.

8. The vector processing computer system of claim 7 wherein the processor performs operations on the words in the first and second data vector registers based on the value in each corresponding bit position in the vector mask register.

9. The vector processing computer system of claim 8 wherein the operations comprise vector merge instructions.

10. The vector procesing computer system of claim 8 wherein the operations comprise load and store operations.

11. The vector processing computer system of claim 9 wherein each of the plurality of detectors respectively detects a consecutive power of 2 minus 1 number of leading zeros and wherein the detector of the highest number of leading zeros increments a mask register pointer which points to the vector mask register bit position and data vector word position in accordance with the number of zeros it detected plus 1.

12. The leading zeros detector of claim 11 and further comprising a next address generator coupled to the leading zeros detectors for determining a memory address as a function of the number of zeros detected.

13. The leading zeros detector of claim 12 wherein the leading zeros detectors comprise logical OR gates coupled to the vector mask.

14. A method of performing operations in a vector based computer system having a processor, a plurality of data word vector registers and a vector mask register in accordance with the values of bit positions in the vector mask register which correspond to the positions of data words in the data word vector register comprising the steps of:

a) maintaining a current bit position;

b) detecting an approximate number of leading zeros comprising the values of consecutive powers of 2 minus 1 number of leading zeros, but no greater than the number of words in the data word register, in the vector mask register from said current bit position;

c) updating the current bit position based on the number of leading zeros approximated if leading zeros were detected; and d) performing an operation on the data word in the data word vector register at the current bit position if the next bit position does not contain a zero.

15. The method of claim 14 and further comprising the step of:

e) repeating steps b and c while leading zeros are detected.

16. The method of claim 14 wherein following step c, if a one is detected in the next bit position of the vector mask register, performing step d during a same clock cycle of the computer system as steps a, b and c were performed.

17. The method of claim 14 wherein step b is performed by a plurality of OR logic gates.

18. A leading zeros detector for a vector mask in a vector processing system comprising:

a plurality of leading zero detectors coupled to the vector mask for approximating the number of leading zeros in the mask and providing a shift count representative of the approximate number of leading zeros, wherein the leading zero detectors comprise a plurality of detectors of different non-consecutive numbers of leading zeros and wherein the detector of the highest number of leading zeros provides the shift count.

* * * * *